United States Patent [19]

Earl

[11] Patent Number: 4,665,879
[45] Date of Patent: May 19, 1987

[54] FUEL EVAPORATION APPARATUS AND METHOD

[76] Inventor: Gregory Earl, 4005 Saul Rd., Kensington, Md. 20895

[21] Appl. No.: 834,602

[22] Filed: Feb. 28, 1986

Related U.S. Application Data

[63] Continuation-in-part of Ser. No. 761,170, Aug. 1, 1985, Pat. No. 4,622,944, which is a continuation-in-part of Ser. No. 639,315, Aug. 10, 1984, Pat. No. 4,538,583.

[51] Int. Cl.$^4$ .............................................. F02M 15/00
[52] U.S. Cl. ................................... 123/557; 123/549; 123/523
[58] Field of Search ............... 123/557, 558, 523, 549

[56] References Cited

U.S. PATENT DOCUMENTS

| | | | |
|---|---|---|---|
| 4,112,889 | 9/1978 | Harpman | 123/557 |
| 4,372,280 | 2/1983 | Adams | 123/557 |
| 4,515,135 | 5/1985 | Glass | 123/557 |

*Primary Examiner*—E. Rollins Cross
*Attorney, Agent, or Firm*—Sherman and Shalloway

[57] ABSTRACT

Disclosed herein is an improved fuel evaporation apparatus which comprises a two-stage evaporator designed to receive fuel such as gasoline in a liquid form and to completely transform the liquid fuel into its vapor state so as to increase the efficiency of operation of the associated internal combustion engine. In the first stage, the liquid fuel is conducted so as to strike a heated plate and thereafter any fuel which still resides in the liquid state flows through holes provided in the plate in droplet form and then enters vapor tubes which conduct the fuel in heat exchange relationship with exhaust gas from the internal combustion engine. After the fuel has been completely changed to vapor by flowing the fuel through the apparatus, the fuel is conducted, preferably, to the venturi stack or stacks of the carburetor of the associated internal combustion engine. Also disclosed herein is the method of evaporating fuel utilizing the above-described apparatus.

9 Claims, 2 Drawing Figures

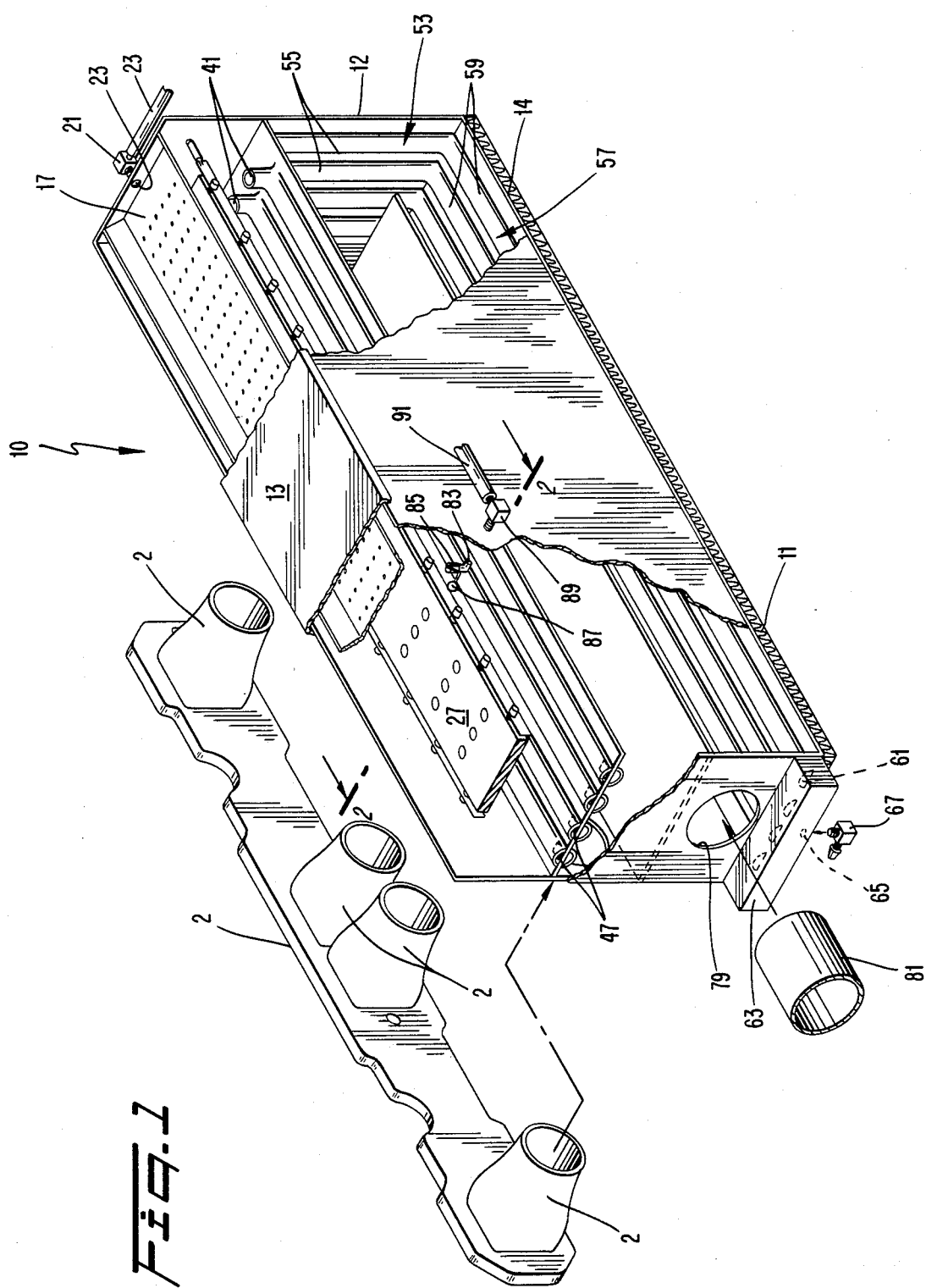

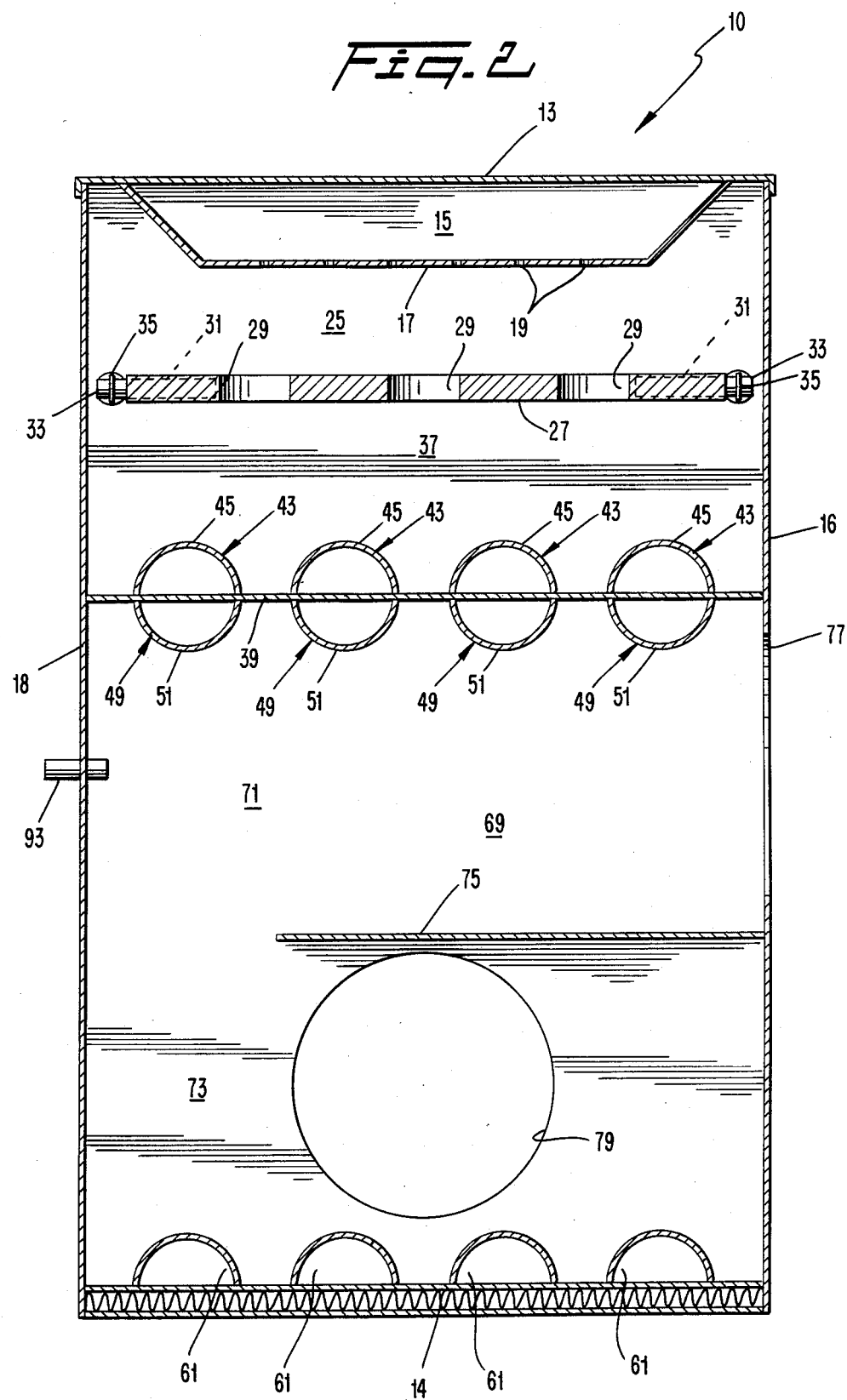

FUEL EVAPORATION APPARATUS AND METHOD

This application is a continuation-in-part of U.S. application Ser. No. 06/761,170, filed Aug. 1, 1985, now U.S. Pat. No. 4,622,944, which is a continuation-in-part of U.S. patent application Ser. No. 06/639,315 filed Aug. 10, 1984, now U.S. Pat. No. 4,538,583. Each of these prior U.S. patent applications are hereby incorporated by reference in this application.

BACKGROUND OF THE INVENTION

In the prior application, an improved apparatus for evaporating fuel was disclosed which quite efficiently evaporates liquid fuel so that it is presented to the carburetor of an internal combustion engine in completely vaporized form so as to increase the efficiency of the combustion of the internal combustion engine. While the invention disclosed in the prior patent application operates quite efficiently, Applicant has conducted further research to devise ways of more efficiently and economically heating the fuel to its vapor point so as to further improve upon the teachings of the invention disclosed in the prior application. During this research, it was discovered that a more efficient approach to the problems of fuel evaporation might include a lesser emphasis upon the use of glow plugs to heat the plate or plates on which the liquid fuel impinges and a greater emphasis upon the use of the heat found in exhaust gases created by the operation of the internal combustion engine. Thus, in order to increase efficiency while reducing the drain on the vehicle battery and generating system, the present invention was created.

Applicant is aware of several prior art documents which are believed to be only generally related to the teachings of the present invention, as follows:

U.S. Pat. No. 541,773 to Mead.
U.S. Pat. No. 1,465,574 to Bannister.
U.S. Pat. No. 1,603,660 to Cassella.
U.S. Pat. No. 1,980,496 to Musselwhite.
U.S. Pat. No. 1,608,018 to Eldred.
U.S. Pat. No. 1,997,497 to Pogue.
U.S. Pat. No. 2,049,687 to Chamberland, et al.
U.S. Pat. No. 2,219,522 to Hinsch.
U.S. Pat. No. 2,306,897 to Ollig.
U.S. Pat. No. 2,650,582 to Green.
U.S. Pat. No. 3,872,191 to Walcker.
U.S. Pat. No. 3,886,919 to Freeman.
U.S. Pat. No. 3,916,859 to Fossum.
U.S. Pat. No. 3,961,616 to Brown.
U.S. Pat. No. 4,015,569 to Leshner, et al.
U.S. Pat. No. 4,106,457 to Totten, et al.
U.S. Pat. No. 4,112,889 to Harpman.
U S. Pat. No. 4,139,582 to Collins.
U.S. Pat. No. 4,151,821 to Wichman, et al.
U.S. Pat. No. 4,212,274 to Quick.
U.S. Pat. No. 4,213,433 to Day.
U.S. Pat. No. 4,223,652 to Budnicki.
U.S. Pat. No. 4,349,001 to Wagner.
U.S. Pat. No. 4,350,134 to Sparks.
Japanese Pat. No. 490,266 to Feroldi.

While some of these patents teach some of the aspects of the present invention, Applicant believes that none of them teach, either singly or in combination, all of the inventive features combined into the present invention.

SUMMARY OF THE INVENTION

In prior application Ser. No. 06/761,170, a fuel evaporator device is disclosed in great detail, including its association into the fuel supply system and electrical system of an internal combustion engine device. For simplicity, the present invention will be disclosed herein in terms of the elements of the evaporator per se and the details of the electrical system and fuel supply system of the associated internal combustion engine will be shown only as necessary and essential to the understanding of the teachings of the present invention. In the detailed description of the preferred embodiments which follows hereinafter, when elements corresponding to elements disclosed in the prior patent application are to be included in association with the present invention, this will be stated in detail.

The present invention includes the following interrelated elements:

(a) In a first aspect of the present invention, the inventive evaporator is in a rectangular cubic form having a removable cover which reveals an inlet chamber containing a trough having a plurality of micropores therein. Liquid fuel from the fuel tank is supplied to this chamber with trough by the vehicle fuel pump.

(b) With the cover securely fastened over the chamber, liquid fuel may fill up the inlet chamber and when sufficient fuel is present, the fuel is forced through the micropores and sprays into the first stage evaporation chamber below. The first stage evaporation chamber has a floor which comprises an apertured plate which is heated by a plurality of heating devices such as glow plugs. When the fuel in its sprayed form impinges upon the apertured plate, the fuel is heated and some of it evaporates to form fuel vapor. The fuel vapor is conducted through the plate and into the second stage evaporation chamber while un-vaporized fuel flows through the apertures in the apertured plate and enters the above-described second stage evaporation chamber.

(c) The second stage evaporation chamber comprises a chamber bounded on its bottom with a plate having mounted on its top and bottom a plurality of conduits, preferably of semi-circular cross-section. Thus, liquid fuel droplets in the second stage evaporation chamber flows through these vapor tubes. Meanwhile, on the underside of the plate bounding the bottom of the second stage evaporation chamber, a further chamber is formed in which exhaust gases are conducted so as to heat the plate and the passages connected thereto as well as any vapors or liquid droplets which flow through the tubes. Thus, liquid droplets and vaporized fuel are conducted through the tubes which extend not only along the full longitudinal extent of the plate bounding the bottom of the second stage evaporation chamber, but also extend along one vertical wall of the evaporation device and along the bottom wall with the walls on which the vapor tubes extend bounding the chamber in which exhaust gases are conducted.

(d) By the time the fuel has reached the end of the vapor tubes, it is completely vaporized and enters a manifold from which it is conducted to a location such as the venturi stack of a carburetor where the completely vaporized fuel is mixed with air and then conducted into the cylinders of the internal combustion engine.

(e) The heating devices contained in the apertured plate are provided with electrical power by an electrical system substantially identical to that which is depicted in FIG. 3 of parent application Ser. No. 06/761,170.

Accordingly, it is a first object of the present invention to provide an improved evaporation apparatus and method of evaporating liquid fuel.

It is a further object of the present invention to provide an evaporation apparatus which includes two stages which act to completely vaporize liquid fuel which fuel so vaporized is utilized in an internal combustion engine.

It is a still further object of the present invention to provide such a device which uses electrical means to heat and vaporize the liquid fuel.

It is a still further object of the present invention to provide such a device which includes heat exchange means which utilizes heat from the exhaust gas of the associated internal combustion engine to heat the liquid and vaporized fuel.

It is a still further object of the present invention to provide such a device which may be easily be incorporated into an existing internal combustion engine system in an existing vehicle.

It is a still further object of the present invention to provide such a device for an internal combustion engine which increases the efficiency in the burning of the fuel-air mixture thereof.

It is a still further object of the present invention to provide such a device with a unique combination of electrical and exhaust gas heating techniques for use to heat fuel.

These and other objects, advantages and features of the present invention will be better understood from the following detailed description of the preferred embodiments when considered in conjunction with the accompanying drawing figures.

BRIEF DESCRIPTION OF THE DRAWINGS

FIG. 1 shows a perspective view of the present invention with certain parts broken away to show detail.

FIG. 2 shows a cross-section view along the line 2—2 of FIG. 1.

DETAILED DESCRIPTION OF THE PREFERRED EMBODIMENTS

Reference is first made to FIG. 1 which schematically shows a flange 1 which is adapted to be attached to an internal combustion engine (not shown), the flange 1 having a plurality of exhaust tubes 2 incorporated therewith. The inventive two stage evaporation apparatus is designated by the reference numeral 10 and includes a housing 11 of generally rectangular cubic configuration and having a cover 13 removably attached thereto. The cover 13 defines the top wall of an inlet chamber 15 (FIG. 2) which chamber 2 is also defined at its bottom by a trough 17 having a plurality of micropores 19 extending therethrough.

As seen in FIG. 1, a fitting 21 is provided which extends through an opening 23 formed in a sidewall of the housing 11 so as to communicate the inlet chamber 15 with a conduit 23 connected via a fuel pump (not shown) to the fuel reservoir of the associated vehicle.

The trough 17 also defines the upper wall of a first stage evaporation chamber 25 (FIG. 2) which is defined at its bottom by an apertured plate 27 having a plurality of apertures 29 extending completely therethrough. As seen in FIG. 2, the apertured plate 27 is connected to the walls of the housing 11 and includes a plurality of lateral openings 31 therein into which are mounted, in the preferred embodiment, respective glow plugs 33 interconnected by electrical conductors 35 and connected into the electrical system of the automobile in the manner taught and disclosed in U.S. patent application Ser. No. 06/761,170, with particular description thereof being shown in FIG. 3 thereof.

The apertured plate 27 also forms the top wall of a second stage evaporation chamber 27 which chamber 37 is defined at its bottom extent by a further heat exchange plate 39. Fuel which has not evaporated in the first chamber 25 flows through the apertures 29 in the apertured plate 27 and arrives in the second stage evaporation chamber 37 where liquid droplets are vaporized due to the high temperature created in the chamber 37 by the glow plugs above and the exhaust fumes in the chamber 69 below which heat the plate 39 bounding the chamber 37 at its bottom. Liquid fuel droplets and vaporized fuel will flow into the ports 41 responsive to the vacuum applied thereto by the operation of the engine. If liquid fuel flows into the chamber 37 faster than droplets and vapor can flow out the ports 41, it may begin to fill the chamber 37 until the level of the liquid fuel rises above the ports 41 whereupon the liquid fuel is caused to flow into the first set of vapor tubes 43 which are preferably formed of semi-circular cross-section and are defined by curved portions 45 and the surface of the heat exchange plate 39. The fuel may flow in the left-hand direction as shown in FIG. 1 until reaching the left-hand most area of the heat exchange plate 39 where openings 47 are provided to communicate the vapor tubes 43 with further vapor tubes 49 preferably also formed of a semi-circular cross-section and defined by curved sections 51 and the bottom surface of the heat exchange plate 39.

Liquid fuel droplets and vaporized fuel in the vapor tubes 49 flows in the right-hand direction as shown in FIG. 1 until reaching the wall 12 of the housing 11 whereupon the vapor tubes 49 connect with vertical vapor tubes 53 which may, if desired, be formed by curved sections 55 as well as by the inner surfaces of the wall 12.

The vapor tubes 55 connect with further vapor tubes 57 formed on the bottom wall 14 of the housing 11 and, may, if desired, be comprised of curved sections 59 and the inner surfaces of the wall 14. Fuel in the vapor tubes 59 flows in the left-hand direction in FIG. 1 until being outputted at the ports 61 into a manifold 63 which collects the now completely vaporized fuel and conducts it to an outlet port 65 having connected thereto an outlet fitting 67.

The fuel is completely vaporized when it arrives at the manifold 63 because the vapor tubes 43, 49, 53, 57 flow in surrounding relation to a heating chamber 69 into which exhaust gases from the exhaust tubes 2 are conducted. For this purpose the chamber 69 is divided into a top portion 71 and a bottom portion 73 by a lateral wall 75 which extends partially into the chamber 69 from the housing wall 16. A plurality of inlet ports 77 are provided in the wall 16 within the upper exhaust chamber 71 with the number of ports 77 corresponding to the number of exhaust tubes 2. Thus, exhaust gas is conducted into the upper exhaust chamber 71, impinges against the wall 12 as well as the sidewall 18 and thereafter enters the lower exhaust chamber 73 whereupon the exhaust gases are exhausted through the exhaust port 79 and thence into the exhaust system via the pipe 81. Thus, the walls 12, 14 as well as the heat exchange plate 39 are all exposed to the exhaust gas and are heated thereby. Thus, since these walls at least partially form the vapor tubes through which the liquid and vaporized fuel flow, the fuel is heated and completely vaporized by this heat exchange relation.

The outlet fitting 67 may, if desired, be connected via tubing (not shown) to the venturi stack of a carburetor associated with an internal combustion engine not forming a part of the present invention, however, if desired, the outlet fitting 67 may be connected via such tubing to any fuel supply system desired such as fuel injectors, etc.

With reference back to FIG. 1 it is seen that within the chamber 37, a port 83 is provided which is at a slightly lower elevation than the elevation of the vapor tube inlet 41. A butterfly valve 85 is provided within the port 83 and this butterfly valve is operated by the float 87. The valve 85 and float 87 are designed so that if liquid fuel accumulates in the chamber 37 a predetermined level higher than the inlets 41, the float 87 will rise to a sufficient level that the butterfly valve 85 will open thereby allowing liquid fuel to be drained from the chamber 37 out the fitting 89 and back to the reservoir (not shown) via a conduit 91.

As shown in FIG. 2, a temperature sensor 93 may be provided in the upper exhaust chamber 71 of the chamber 69. The purpose for this temperature sensor 93 is to sense the temperature of exhaust gases in the chamber 69 and responsive to the temperature to control the supply of fuel to the apparatus 10. In this regard, as disclosed in parent application Ser. No. 06/761,170, when the associated internal combustion engine has not been used for long periods of time or, for example, on cold mornings, the associated carburetor may be provided with cold start valves which may be supplied directly with fuel from the reservoir while bypassing the evaporation apparatus. Then, responsive to a timer or a temperature sensor, a valve may be controlled to cut off the supply of fuel to the cold start valves after the engine has sufficiently warmed up. In this vein, the temperature sensor 93 is electrically connected to a bypass valve (not shown) which may control the flow of fuel from the fuel reservoir either from the reservoir directly to the carburetor or from the reservoir to the carburetor via the apparatus 10. As designed, as long as the temperature in the chamber 69 is below a predetermined level, the above-described valve will be in a position so that fuel flows directly from the fuel reservoir to the carburetor. When the temperature in the chamber 69 rises above the predetermined level, as sensed by the temperature sensor 93, the above-described valve will be actuated to a position wherein the fuel flows from the fuel reservoir to the carburetor via the apparatus 10. If desired, a similar temperature sensor may be provided either along with the temperature sensor 93 or as an alternative thereto in the apertured plate 27 to sense the temperature of the apertured plate 27 as heated by the glow plugs 33 and responsive thereto to control the above-described valve.

As an alternative, the associated internal combustion engine may be provided with two carburetors, an idle carburetor and a vapor carburetor. When the temperature in the exhaust gas chamber 69 is below a predetermined level, the above-described valve may be operated so that the fuel solely goes through the idle carburetor. When the temperature rises above a predetermined level, the above-described valve may be operated so that fuel supply to the idle carburetor is shut off and all of the fuel is conducted to the vapor carburetor via the apparatus 10.

Accordingly, an improved fuel evaporation apparatus has been disclosed hereinabove which fulfills each and every object delineated hereinabove. It is contemplated that various modifications, alterations and changes in the teachings of the present invention may occur to those skilled in the art. Accordingly, it is intended that the invention should not be limited to the embodiments specifically described hereinabove, but rather that the invention disclosed herein should only be limited by the scope of the appended claims.

I claim:

1. An improved evaporation apparatus for use in the fuel supply system of an internal combustion engine, comprising:
   (a) housing means including an opening closed by removable cover means;
   (b) inlet means for admission of fuel to inlet chamber means defined by said cover means and by trough means mounted in said housing means, said trough means having a plurality of pores extending therethrough;
   (c) first evaporation chamber means defined by said trough means and by an apertured plate controllably heated by heating means, fuel entering said first evaporation chamber means through said pores;
   (d) second evaporation chamber means defined by said apertured plate and by a heat exchange plate, fuel entering said second evaporation chamber means through apertures in said apertured plate, said heat exchange plate being heated by exhaust fumes of said engine; and
   (e) outlet means for evacuating vaporized fuel from said apparatus.

2. The invention of claim 1, wherein said heating means includes glow plugs.

3. The invention of claim 1, wherein said heat exchange plate has mounted thereon a plurality of vapor tubes for conducting fuel therethrough in heat exchange relation with said heat exchange plate.

4. The invention of claim 3, further wherein said heat exchange plate has a first surface within said second evaporation chamber means and a second surface located within a heating chamber adjacent said second evaporation chamber means, said exhaust fumes being conducted through said heating chamber.

5. The invention of claim 4, wherein at least one of said vapor tubes is mounted on each of said first and second surfaces.

6. The invention of claim 5, wherein each said vapor tube comprises a curved tube section and a portion of one of said surfaces.

7. The invention of claim 5, wherein a further vapor tube connects with said at least one second surface vapor tube, said further vapor tube being mounted on a wall of said heating chamber.

8. The invention of claim 1, wherein said outlet means includes a manifold for collecting fuel vapors from said apparatus.

9. The invention of claim 4, further including a conduit mounted on said first surface and having a float operated valve therein, said valve opening when liquid fuel in said second evaporation chamber means rises above a predetermined level.

* * * * *